July 4, 1961
A. E. SMOLL ET AL
2,990,965
CONVEYOR CONTROL SYSTEM
Filed May 22, 1958
2 Sheets-Sheet 2
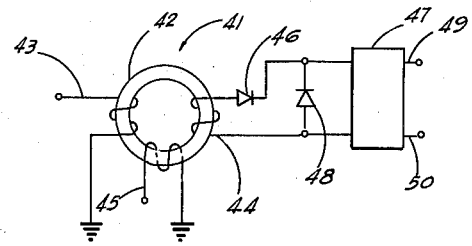
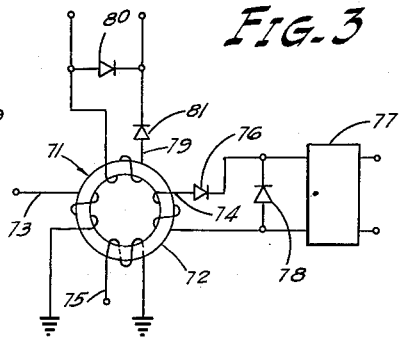
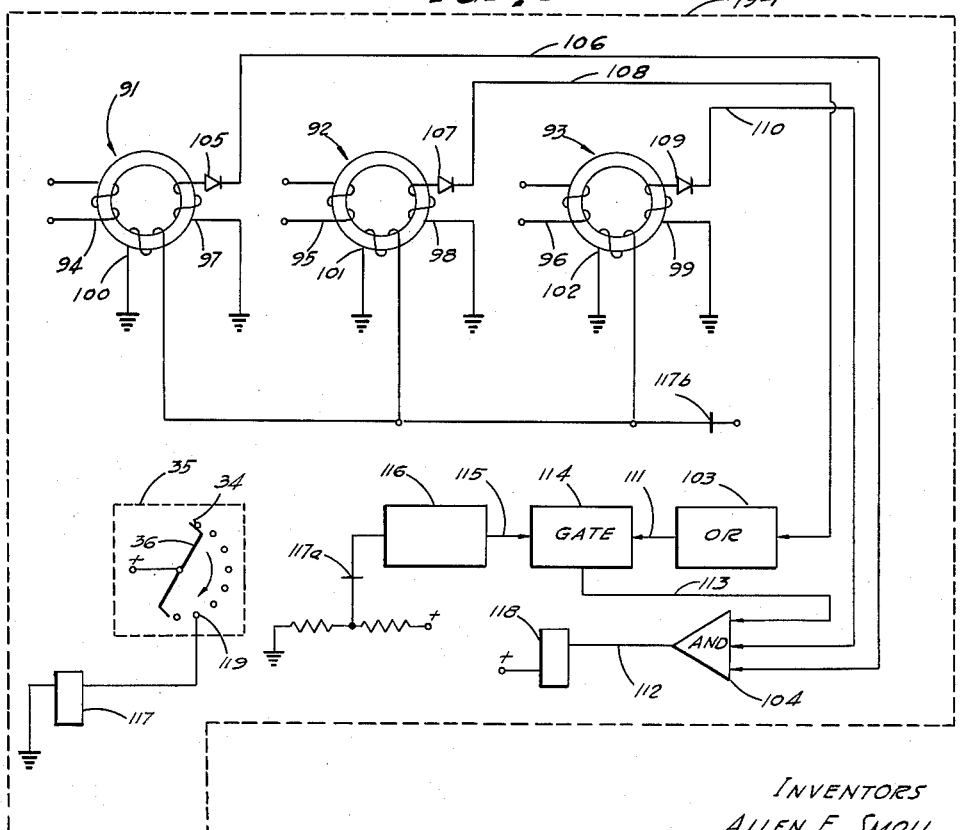
INVENTORS
ALLEN E. SMOLL
JAMES E. VANNESS
By John C. Black
ATTORNEY

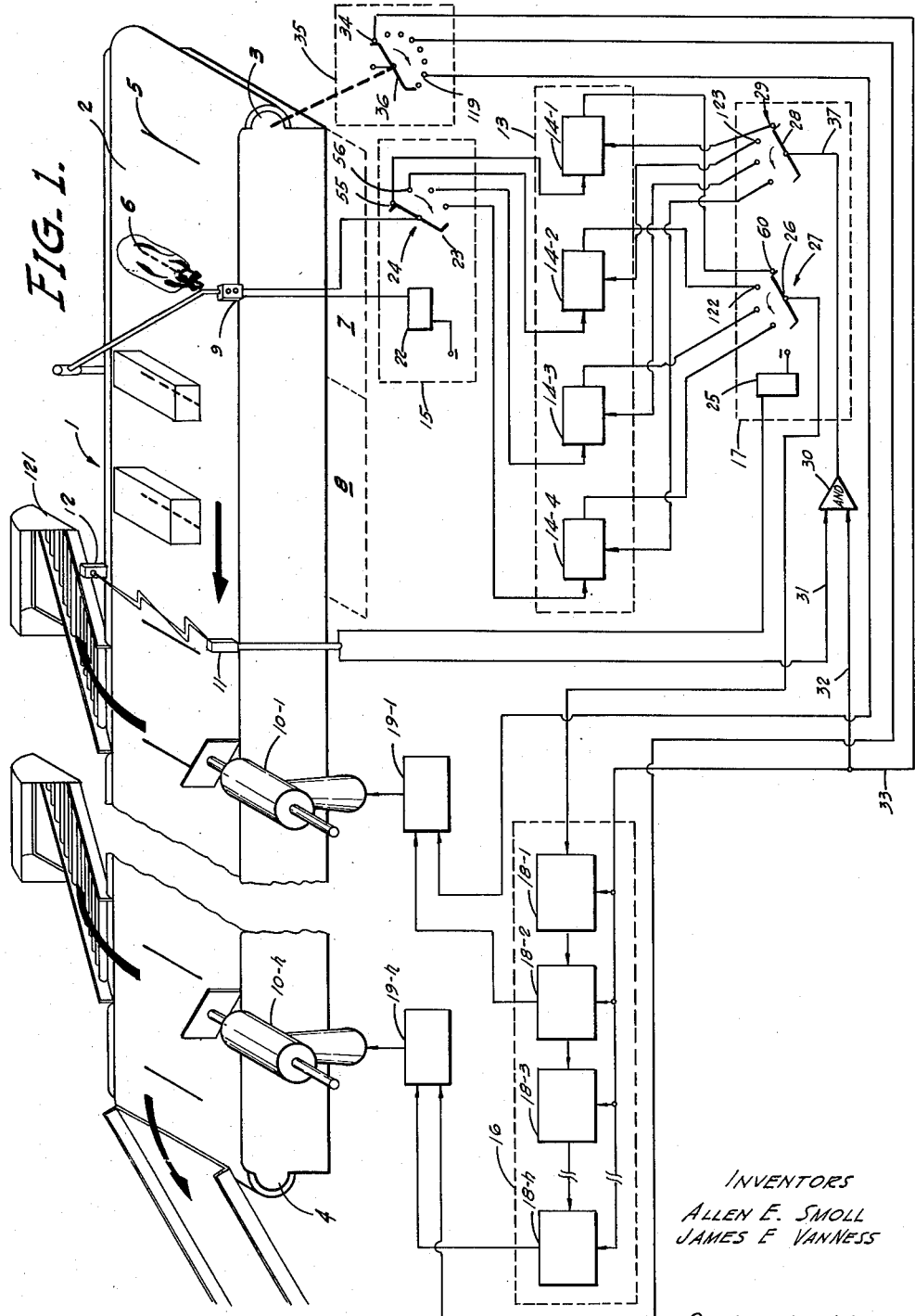

United States Patent Office 2,990,965
Patented July 4, 1961

2,990,965
CONVEYOR CONTROL SYSTEM
Allen E. Smoll, Arlington, Mass., and James E. Van Ness, Evanston, Ill., assignors to Stewart-Warner Corporation, Chicago, Ill., a corporation of Virginia
Filed May 22, 1958, Ser. No. 737,052
10 Claims. (Cl. 214—11)

This invention relates to improvements in conveyor control systems.

The preferred embodiment has been particularly adapted for use with a horizontal type belt conveyor in a parcel post sorting system; however, the invention is not to be limited thereto. Generally, in conveyor systems of this type, packages are loaded manually at one end of the belt for movement along an extended path; and, laborers, positioned at various positions along the path, selectively unload those packages intended for removal at their respective positions. Packages, removed at each position, are then placed in a respective railroad car.

In a few instances, attempts have been made to automate the system by providing electrical control means for removing packages at the various belt positions. However, such systems have been relatively unflexible and unusually complex.

The applicants herein propose an improved electrical control system, which is simplified yet versatile. Applicants' system requires minimum maintenance and is generally free of mechanical wear and other causes of component failures.

Briefly, the present system includes a horizontal belt type conveyor in which the belt is marked with lines at predetermined intervals, for example, every three feet. Packages are loaded on the belt with their centers coincident with the lines on the belt. The conveyor belt path is divided into a plurality of arbitrary zones each equal in length to the distance between succeeding lines on the conveyor belt. The zones are divided into two groups generally. The first group includes an area or station in which packages are loaded on the belt and an area or station in which an operator reads the package addresses and causes corresponding binary address codes to be written in a temporary storage device. The second group of zones include the various unloading positions or stations. Each zone in the second group has a corresponding stage in a shift register storage device which is synchronized with the movement of the conveyor belt.

The temporary storage device includes a plurality of sections which are utilized consecutively to store the codes of succeeding packages passing the operator's coding station. The storage device includes as many sections as there are zones between the beginning of his station and a position adjacent the first unloading station in the conveyor belt.

As the packages move along with the belt, the operator notes their address and causes a corresponding code to be placed in the temporary storage device. As each package approaches a predetermined position adjacent the first zone of the above described second group of zones, its address information or code is transferred from the temporary storage device to the first stage of the synchronized shift register. The transfer of the address information from the temporary storage device to the shift register is preferably controlled in part by a photocell which detects each package as it passes said predetermined position. The address information of each package is shifted from stage to stage of the shift register as the package progresses from zone to zone.

Certain of the zones include package unloading or transfer devices. Each shift register stage corresponding to a zone having a transfer device is connected to an address code detecting circuit. As each package moves into such a zone, its address code is shifted to the respective detecting circuit. The detecting circuit analyzes the address code to determine whether or not the package should be discharged. In the event that the detecting circuit senses its assigned address code, its associated transfer device pushes the package from the conveyor belt to an adjacent gravity type conveyor. In the event that the detecting circuit senses an address code other than its assigned code, such code is erased from the detecting circuit; and the package remains on the belt.

Accordingly, it is an object of the present invention to provide an improved conveyor control system in which routing information for each successive package is placed in a temporary storage device which is not synchronized with the conveyor belt movement and in which the routing information is subsequently transferred from the storage device to a shift register synchronized with conveyor belt movement as the package moves into the conveyor belt section in which unloading devices controlled by the shift register are disposed.

A feature of the present invention is the use of a shift register as a stationary analogue of the moving conveyor system.

Another feature is the use of a multi-section information storage device together with a switch for selecting succeeding sections for storing address codes of succeeding packages.

Another feature is the use of a photocell and a switch to transfer address codes from the storage device to the shift register in the same order that the codes are written into the device.

Other objects and features will be evident upon a perusal of the following description in which:

FIG. 1 is a diagrammatic representation of the improved control system;

FIG. 2 is a schematic diagram of a typical circuit used in certain stages of the shift register and in the temporary storage device;

FIG. 3 is a schematic diagram of a typical circuit utilized in certain other stages of the shift register; and FIG. 4 shows a typical address code detecting circuit.

The conveyor 1 (FIG. 1) includes a belt 2 carried by a pair of spaced rotatable drum assemblies 3 and 4 one of which is driven by a prime mover (not shown). The belt 2 includes a plurality of spaced transverse lines 5 for centering the packages 6. A loading zone 7 is provided at the right hand end (FIG. 1) of the conveyor 1. An address code marking zone 8 is at the left side of the loading zone 7.

A movable keyboard 9 is positioned in the marking zone 8. A plurality of discharge devices 10—1 to 10–$n$ are provided to the left of the marking zone 8. There will be provided as many discharge devices such as 10—1 as there are unloading positions adjacent the belt path.

A photocell circuit 11 and light 12 are disposed on opposite sides of the belt 2 adjacent the first discharge device 10—1. The photocell circuit 11 detects a package leaving the marking zone and entering the zone in which or adjacent which the first discharge device 10—1 is located. The circuit 11 may be any conventional circuit which produces an output pulse when the light source for its photocell is interrupted.

A temporary storage device 13 is provided. The device 13 includes multi-channel storage sections 14—1 to 14—4 inclusive, each of which is capable of storing an address code. The keyboard 9 has access to each of the storage sections in sequence by way of a stepping switch 15. The outputs of the storage sections such as 14—1 are connected sequentially to a shift register 16 by way of a stepping switch 17.

The shift register 16 has a plurality of multi-channel stages 18—1 to 18—n inclusive. Each of the stages such as 18—1 corresponds to a zone adjacent the conveyor belt path. Certain stages such as 18—2 are connected to package address code detecting circuits such as 19—1. As a package moves from zone to zone along the conveyor path, its address code is shifted from stage to stage in the shift register. As a package enters a zone in which a discharge device such as 10—1 is located, its address information is transferred not only into the respective shift register stage such as 18—2 but also into the corresponding address detector such as 19—1.

The address detectors 19—1 and 19—n respectively control the operation of transfer devices 10—1 and 10—n incident to the detection of predetermined respectively assigned codes.

The keyboard 9 may be any one of a number of types commercially available which include manually depressible code permutation keys (not shown) for selecting predetermined codes in binary form. For example, three keys may be utilized for selecting any one of the seven codes available in a three digit binary code group, which codes are commonly written as 001, 010, 100, 011, 101, 110 and 111. Each one of the stations such as 10—1 at which packages are removed from the belt 2 by a respective discharge device is assigned a respective one of the binary codes. One key is utilized for each digit position in the code. A nondepressed key normally represents a "0"; and a depressed key, a "1." Thus the code 101 is formed by depressing the keys corresponding to the first and third digit positions. These codes are then translated into electrical form in the keyboard by providing a pair of electrical code permutation contacts (not shown) for each key. When a key is depressed, its contacts are operated from an open to a closed position. Hence closed contacts represent a "1"; and open contacts, a "0." The keyboard 9 also includes a manually depressible shift bar (not shown). The shift bar is depressed subsequent to the selection of a desired code to cause electrical signals corresponding to the code to be sent to the temporary storage device 13. More specifically, the shift bar in a typical keyboard is momentarily depressed to close a pair of contacts (not shown). These contacts connect a battery potential, or writing voltage, to one contact in each pair controlled by the keys. This writing voltage is in turn connected to the other contact of each depressed key. Hence, the presence and absence of the writing voltage at the other contact of each key respectively represents a "1" and "0." These other contacts are connected electrically to the storage device 13 by way of the switch 15. This will be described in more detail later. Therefore, when the shift bar is depressed, signals (the presence or absence of battery potential) corresponding to the selected binary code are sent to the storage device 13.

In a typical keyboard, the keys remain depressed after their actuation. The shift bar, however, immediately releases as soon as the depressing force is removed. The shift bar, in releasing, normally actuates a lever means (not shown) for releasing those keys which are depressed.

As indicated earlier, the present system is particularly adapted for sorting mail bags or parcel post packages for loading on various railroad cars prior to shipment to distant urban areas. An operator notes the written destination on the mail bag or packages and selects a digital code corresponding to a discharge station which routes packages by means of its gravity conveyor to the particular railroad car going to the written destination.

The stepping switch 15 includes a stepping magnet 22 which is energized each time that the shift bar of the keyboard 9 is depressed. The stepping switch 15 may be of the escapement drive type which advances the wipers thereof one step incident to the de-energization of the magnet 22.

FIG. 1 is a one-line diagram; and, therefore, several of the elements represent a plurality of similar elements similarly connected. Thus, the stepping switch 15 includes a plurality of wipers 23, the number of which depends upon the number of digits required for binary coding of the address information. For example, if there are seven discharge stations; a three digit code sequence is required—i.e. 001, 010, 100, 011, 101, 110, 111—. The code 000 is used herein to represent the absence of an address code. Thus, with seven discharge stations, only three wipers such as 23 are required.

Each of the wipers 23 has access to a level of contacts 24. Each succeeding contact of a level 24 is connected to a corresponding channel in succeeding storage sections 14—1 to 14—4 of the storage device 13. Each storage section such as 14—1 includes a plurality of elements or channels depending upon the number of digits required for binary coding. Thus, for seven discharge stations only three digits and, therefore, three channels are required.

The switch 17 is generally similar to switch 15. The switch 17 includes a stepping magnet 25 which is energized each time that the photocell circuit 11 detects a package. Upon de-energization of the magnet 25, the switch 17 advances its wipers 26 one step. The switch 17 includes a plurality of wipers 26 equal in number to the wipers 23 of switch 15. The switch 17 sequentially connects the storage sections 14—1 to 14—4 to the first stage 18—1 of the shift register 16. Each of the wipers 26 has access to a level of contacts 27. Each succeeding contact in each level 27 is connected to the output of a respective channel of succeeding storage sections 14—1 to 14—4. Further, each level such as 27 is assigned to a corresponding channel of the storage sections 14—1 to 14—4.

The switch 17 also includes a control wiper 28 and a corresponding level of contacts 29. The wiper 28 is connected to the output of an AND circuit 30 of any well known type which produces an output pulse incident to the simultaneous application of marking voltages to all of its inputs. One of the inputs 31 of the AND circuit 30 is connected to an output of the photocell circuit 11. The other input 32 of the AND circuit 30 is connected to a zone pulse conductor 33.

The photocell circuit 11 produces an output pulse at the input 31 during the time interval in which each passing package 6 interrupts the light source 12 of the photocell circuit 11. Thus, a voltage is applied to the input 31 of the AND circuit 30 during the time interval that each package passes by the photocell circuit 11.

The zone pulse conductor 33 is connected to a first contact 34 of a rotary switch 35. The switch 35 includes a wiper 36 which is driven in synchronism with the movement of the conveyor belt 2, for example, by means of a gear train (not shown) interconnecting the wheel 3 and the shaft (not shown) which carries a wiper 36 of the switch 35. The gear train is arranged such that the wiper 36 sequentially engages all of the contacts accessible thereto during movement of the belt a distance equal to the spacing between the lines 5. The gear train is also arranged such that the wiper 36 engages the contact 34 to produce a zone pulse, that is the application of negative battery voltage to a conductor 33, each time that the lines 5 enter the next succeeding zones. Thus, each time that the lines 5 enter succeeding zones, a voltage is applied to the input 32 of the AND circuit 30.

Thus, it will be appreciated that the AND circuit 30 will produce a pulse at its output 37 when the stripes 5 enter their next succeeding zones while a package is passing the photocell circuit 11.

The output pulses of the AND circuit 30 are applied to the wiper 28 and its accessible contact level 29. Succeeding contacts of the level 29 are connected to succeeding storage sections 14—1 to 14—4. As will be described later, the pulses will shift address codes from the storage sections 14—1 to 14—4 into the first stage 18—1 of the shift register 16 as packages pass the photocell circuit 11.

A typical storage section such as 14—1 will now be described in detail. It will be remembered that section 14—1 includes a plurality of channels, for example, three. FIG. 2 shows a circuit 41 which may be used for each channel of the storage section. The circuit 41 includes a ferrite core 42, an input winding 43, an output winding 44 and a shift pulse input winding 45.

The core 42 is an annular ring made of a non-ferrous magnetic material which can be circumferentially polarized in either direction by passing a properly polarized current through either of its two input coils 43 and 45. It is assumed for purposes of this description that polarization of the core 42 after a pulse in the shift winding 45 represents a "0" for coding purposes. The polarization of the core 42 subsequent to a pulse in the input winding 43 represents a "1." It will be remembered that the code 000 represents the absence of the code. Therefore, pulses in the shifting windings such as 45 of each channel erase any code that might exist in the storage section such as 14—1 and mark the section 000.

With the core 42 marked 0, a pulse in winding 43 reverses the polarization of the core to produce a voltage in the output winding 44 and to mark the core "1." However, a conventional diode 46 connected in the circuit of the output winding 44 is polarized such that no current pulse will flow in the circuit of the output winding.

If, subsequent to the application of a pulse to the input winding 43 as described above, a shift pulse is applied to the shift input winding 45, the direction of magnetization of the core 42 will again be reversed. Again, a voltage will be induced in the output winding 44. However, this time the polarity of the induced voltage in the winding 44 is such that the diode 46 will pass current in the circuit of the output winding 44. The core 42 will again be marked "0."

The current pulse passed by the diode 46 will be stored momentarily in a conventional delay circuit 47. After a short time delay, the current pulse will be applied to the output conductors 49 and 50. The purpose of the delay circuit 47 is to permit shifting of previously stored information from the channel of the first shift register stage corresponding to the channel defined by circuit 41 and connected thereto by way of the switch 17. A diode 48 prevents polarization of the core 42 by feedback signals from the shift register 16.

Thus, it can be seen that a code permutation bit "1" may be shifted into the channel circuit 41, maintained therein as long as desired, and subsequently shifted out of the channel circuit at will. Obviously, a code permutation bit "0" causes no signal input to or output from the circuit 41.

Assume that the channel circuit 41 is the first channel of the storage section 14—1. The input winding 43 will be connected to the first accessible contact 55 in the level 24. The second and third channels of the section 14—1 are identical to channel circuit. Their respective input windings (not shown) are connected to contacts in positions corresponding to the position of contact 55 but in a level (not shown) similar to level 24. The wiper 23 in the position shown in FIG. 1 engages the contact 55 to connect the input winding 43 (FIG. 2) to the first position code permutation contact (not shown) in the keyboard 9. The wipers (not shown) having access to the other levels of switch 15 similarly connect the input windings of their respective section channel circuits to respective code permutation contacts. A set of normally open shift bar contacts (not shown) in the keyboard 9 are connected in series with the code permutation contacts. When the shift bar of the keyboard 9 is depressed, it closes its shift bar contacts to connect a writing voltage to the code permutation contacts. Each code permutation contact is closed when it represents a "1" and is open when it represents a "0." Consequently, a pulse is applied to the input winding 43 of each channel circuit in which a "1" is to be stored. For example, if the code set up by the keyboard 9 is 110, pulses will be applied to the input windings such as 43 of the first and second channel circuits of the storage section 14—1.

Thus a multi-digit code is transferred to and stored in the section 14—1 incident to the selection of predetermined keys of the keyboard 9 and the subsequent depression of the shift bar. As indicated above, the stepping magnet 22 is energized incident to the depression of the keyboard shift bar. When the shift bar is released, the magnet 22 de-energizes and the wipers such as 23 are advanced to the next accessible contacts such as 56 in preparation for the transfer of a desired address code to the storage section 14—2 when the next succeeding package is read.

It will be remembered that the wipers of the switch 17 advance from position to position in synchronism with the movement of the packages past the photocell circuit 11. When the package which has its address code placed in the storage section 14—1 advances toward the photocell circuit 11, the wipers such as 26 and the wiper 28 will be in the positions shown in FIG. 1. The wipers 26 and 28 will have been advanced to said positions incident to the detection of the next preceeding package.

As the package is detected by the photocell circuit 11, a voltage will be applied to the input 31 of the AND circuit 30. When, soon thereafter, the lines 5 move into the next succeeding zones, the wiper 36 of the switch 35 will apply negative battery potential to the input 32 of the AND circuit 30 by way of contact 34 and conductor 33. The AND circuit 30 will now produce a pulse at its output 37. The output pulse is applied to the shift pulse windings such as 45 (FIG. 2) of each channel of section 14—1 (FIG. 1) by way of wiper 28 (FIG. 1) and contact 29.

Thus, the output pulse from the AND circuit 30 causes the information in each channel of the storage section 14—1 to be shifted after a short time delay into corresponding channels of the first shift register stage 18—1 by way of a contact 60 of the switch 17 and contacts (not shown) in the same position as contact 60 in levels similar to level 27 and by way of wiper 26 and the wipers (not shown) having access to the other levels.

As in the case of the storage sections 14—1 to 14—4 and in the case of the wipers and contact levels of the switches 15 and 17, each stage of the shift register 16 includes as many channels as are required to handle the address codes. Thus, three channels are provided for seven unloading stations.

The channels of those stages which correspond to conveyor path zones not including a discharge device comprising a circuit similar to circuit 41 of FIG. 2. The input windings of such stages are connected to the output windings of the preceeding stage. Their shift pulse windings are connected to the zone pulse conductor 33. Thus, each channel in stages such as 18—1 receive a code bit, store it until the next zone pulse is produced by the switch 35, and then transfer the code bit to the corresponding channel in the next succeeding stage.

It will be recalled that a zone pulse is produced each time that a line 5 (FIG. 1) enters a succeeding conveyor path zone. Since the packages 6 are manually centered on the lines 5, a zone pulse will be produced as each package center enters a succeeding zone. As the package moves from zone to zone its address code is shifted from stage to stage in the shift register 16. The address information is preferably shifted from stage to stage even after the package is removed from the belt 2. Finally the address code is erased when it is shifted from the last shift register stage 18—n.

The shift register stages such as 18—2 and 18–n correspond to zones in which discharge devices such as 10—1 and 10–n are located. They comprise channel circuits similar to the circuit 41 except for the addition of another output winding.

FIG. 3 shows a typical channel circuit 71 for the stage 18—2. The circuit 71 includes a ferrite core 72, an input winding 73, an output winding 74, a shift pulse winding 75, a diode 76, a delay line 77, and a diode 78 similar to and functioning in the same manner as the core 42, the windings 43, 44 and 45, the diode 46, the delay circuit 47, and the diode 48 respectively of FIG. 2. However, in addition, the circuit 71 includes a second output winding 79 which, as will be described below, sends a pulse to its respective address code detecting circuit such as 19—1 whenever an input pulse is applied to the input winding 73 from a preceeding stage.

A pair of diodes 80 and 81, connected to the circuit of the second output winding 79, respectively prevent feedback from the detecting circuit and prevent signals being transferred to the detecting circuit in response to a shift pulse.

Therefore, permutation code bits shifted from the preceeding stage 18—1 into the stage 18—2 are simultaneously shifted into the detecting circuit 19—1. The detecting circuit 19—1 will sample the information shifted thereto to determine the presence or absence of an assigned code permutation.

The detecting circuit 19—1 shown in detail in FIG. 4 will now be described. The code permutation 101 has been assigned to the discharge device 10—1 which is controlled by the detecting circuit 19—1. The circuit 19—1 comprises a plurality of ferrite core circuits 91, 92 and 93 which are somewhat similar to the channel circuit 41 of FIG. 2. The circuits 91, 92 and 93 include input windings 94, 95 and 96, output windings 97, 98 and 99, and shift pulse windings 100, 101 and 102 respectively. The input windings 94, 95 and 96 are connected to respective channel output windings such as winding 79 of FIG. 3.

The output windings 97 and 99 are connected to an AND circuit 104 by way of diodes 105 and 109 and conductors 106 and 110. The output winding 98 is connected to an OR circuit 103. The circuits 91 and 93 respectively correspond to the first and last digits "1" of the code. Circuit 92 corresponds to the middle digit 0.

An OR circuit such as 103 is used in each circuit such as 19—1 to detect the "0's" in its assigned code. The OR circuit produces a pulse at its output if a pulse is received at any one of its inputs. There is only one 0 to be detected by circuit 19—1; consequently, the OR circuit 103 has only one input, that is conductor 108.

The AND circuit such as 104 is used to detect "1's" in the assigned code. The AND circuit produces a pulse at its output incident to the simultaneous application of voltages of proper potential and polarity at all of its inputs. The AND circuit 104 requires an input for each "1" in the code 101 assigned to circuit 19—1.

The AND circuit 104 requires another input 113. A voltage is applied to input 113 in the event the OR circuit 103 detects a "0". This is accomplished by providing a complementor gate 114 which produces an output pulse at the AND circuit input 113 in the event that the OR circuit 103 detects a "0."

The complementor gate 114 may be one of a number of conventional circuits. For example, the complementor gate 114 may include a conventional pentode (not shown). The pentode is normally biased negative below cutoff and therefore is normally nonconducting. If a positive pulse of sufficient amplitude is applied to the control grid of the pentode, the pentode will conduct. However, if a negative pulse of sufficient amplitude is applied to the suppressor grid of the pentode at the same time that the positive pulse is applied to the control grid, conduction by the pentode will be prevented.

The output conductor 111 of the OR circuit 103 is connected to the suppressor grid of the pentode of the complementor gate 114 in such manner that a pulse at 111 will drive the suppressor grid negative. An output conductor 115 of a blocking oscillator 116 is connected to the control grid of the pentode in such manner that a pulse at 115 will drive the control grid positive. The complementor gate 114 will therefore produce an output pulse at conductor 113 only if the blocking oscillator 116 applies a pulse to the conductor 115 when the OR circuit 103 does not apply a pulse to its output conductor 111.

The oscillator 116 may be a conventional circuit including a 5-element thyratron (not shown). The control grid of the thyratron is normally biased negative below cutoff to prevent conduction by the thyratron even while positive voltage is applied to the plate. If a positive voltage of sufficient amplitude is then applied to the suppressor grid of the thyratron, the thyratron will conduct. The oscillator 116 also includes a typical RC circuit connected to the thyratron grid. The RC circuit is charged by the plate current of the thyratron when it conducts, and it biases the grid sufficiently negative to prevent further conduction of the thyratron for a length of time determined by the RC values. Therefore, the application of a positive voltage of sufficient amplitude to the suppressor grid of the thyratron produces the short interval of conduction in the plate circuit of the thyratron followed by a period of nonconduction.

The blocking oscillator 116 has the output conductor 115 connected to the thyratron plate circuit and an input circuit including contacts 117a connected to the suppressor grid of the thyratron. Each time that the contacts 117a close, a positive potential is applied to the suppressor grid to cause an output pulse at 115.

The contacts 117a are closed each time that the address information, if any, in the circuit 19—1 is to be analyzed. The contacts 117a are operated by a relay 117. The relay 117 is energized by the synchronizing switch 35 when a conveyor package-centering line 5 is opposite the center of the transfer device 10—1. It has been assumed that the center of the device 10—1 is in a position seven-eighths of the distance from the beginning to the end of the zone in which the device is located. Accordingly, the relay 117 is operated when the wiper 36 engages its seventh contact 119.

The relay 117 also closes contacts 117b to apply a pulse to the shift pulse windings 100, 101 and 102. An output pulse appears at conductors 106, 108 and 110 if the circuits 91, 92 and 93 respectively are marked with 1's. Thus, incident to each operation of relay 117, the circuits 91, 92 and 93 will produce signals at their outputs corresponding to the code permutation stored therein; and the blocking oscillator 116 will produce a pulse at its output 115.

In the event that a 0 is stored in the circuit 92, no output pulse will be applied to conductor 108. Therefore, there will be no pulse applied to the output 111 of the OR circuit 103; and the complementor gate 114 will apply a pulse to the AND circuit input 113 incident to the blocking oscillator output pulse at 115.

If the "1's" are stored in the circuits 91, and 93, the pulses produced at their outputs 106 and 110 and the gate pulse at 113 cause the AND circuit 104 to produce a pulse at its output 112 to operate a relay 118. The relay 118 operates contacts (not shown) to cause the solenoid operated discharge device 10—1 to operate thereby to push a package from the conveyor belt 2.

Thus, the discharge device 10—1 is operated at the instant in which the center of a package to be discharged is aligned with the center of the discharge device. Also, when relay 117 closes contacts 117b to produce signals in the outputs of the circuits 91, 92 and 93, the address code if any stored in the detector 19—1 is erased in preparation for the receipt of a successding address code incident to the entry of a package into the zone corresponding to the detector 19—1.

A description of the operation of applicants' control system will now be made. Except as otherwise specified, reference can be made to FIG. 1. Assume that the switches 15 and 17 are in the positions shown in FIG. 1.

Assume further than a package 6 has been placed on one of the lines 5 and that an operator has noted a written destination on the package 6 which requires that the package be transferred by the device 10—1 to the gravity conveyor 121. The operator will depress the desired code permutation keys in the keyboard 9 and then depress the shift bar of the keyboard 9. The relay 22 will energize. However, this does not cause the switch 15 to advance its wipers. At the same time, signals corresponding to the code permutation 101 are sent to the multi-channel storage section 14—1 by way of a plurality of wipers such as 23 and contacts such as 55, that is, a pulse will be applied to the input winding such as 43 (FIG. 2) of the first and third channels of the storage section 14—1.

When the shift bar is released, the magnet 22 will de-energize to step the wipers 23 to the next succeeding contacts 56. It can be seen that the switch 15 is now properly positioned to route the address code permutation of the next succeeding package to the storage section 14—2.

Inasmuch as the wipers 28 are in the position shown in FIG. 1, it necessarily follows that there are no other packages on the belt 2 between the package 6 and the photocell circuit 11. Consequently, each time that the wiper 36 of the synchronizing switch 35 engages the contact 34 to produce a zone pulse at conductor 33 no effect is noted at a storage section 14—1. This follows inasmuch as the photocell circuit does not simultaneously produce a pulse at conductor 31. Hence, the AND circuit 30 does not produce a pulse at its output 37.

When, subsequently, the leading edge of the package 6 interrupts the source of light 12, the circuit 11 will produce a voltage at conductor 31. This voltage is maintained at 31 by the photocell circuit 11 until the trailing edge of the package 6 passes the photocell circuit 11 and the light 12. When, during this time interval, the center of the package 12 moves into the zone corresponding to stage 18—1, the wiper 36 engages the contact 34 to apply a zone pulse voltage to conductor 33. This zone pulse is applied to the input 32 of the AND circuit 30. With voltages now simultaneously applied to both inputs of the AND circuit 30, a pulse will be produced at its output 37. The output pulse is extended through wiper 28 and contact 29 to the shift pulse winding such as 45 (FIG. 2) of each channel circuit such as 41 of the storage section 14—1.

It will be remembered that the first and third channels of storage section 14—1 are marked with "1's" while the second channel is marked with "0." Consequently, the output pulse of the AND circuit 30 will cause the first and third channels of the storage section 14—1 to produce pulses in their output windings such as winding 44 (FIG. 2). These pulses will be applied to the input windings such as winding 43 (FIG. 2) of the first and third channels of the shift register stage 18—1 by way of contacts such as 60 and wipers such as 26.

When the photocell circuit 11 detected the package as described above, it also energized the stepping magnet 25 of the switch 17. As soon as the trailing edge of the package 6 passes the photocell circuit 11, the stepping magnet 25 will de-energize to advance the wipers 26 to the next accessible contacts 122 and the wiper 28 to contact 123. The switch 17 is now connected to the storage section 14—2 for processing the routing information of the next package placed on the belt 2.

As the center of the package 6 passes from the zone corresponding to the shift register stage 18—1 into the next succeeding zone corresponding to the shift register stage 18—2, the switch 35 applies a zone pulse to the conductor 33. This zone pulse is applied to the shift pulse winding such as 45 (FIG. 2) of each channel circuit such as 41 of the shift register stage 18—1. Inasmuch as "1's" are stored in the first and third channels of 18—1 pulses are applied to the input windings such as 73 (FIG. 3) of the first and third channel circuits such as 71 of the shift register stage 18—2. The input pulses to the first and third channels of the shift register stage 18—2 produce signals in the output windings such as winding 79 of the first and third channel circuits such as 71. These output pulses from the first and third channels of shift register stage 18—2 are applied to the input windings 94 (FIG. 4) and 96 of the detector 19—1 to cause the code permutation 101 to be stored therein.

When, subsequently, the center of the package 6 reaches the position in which it is aligned with the center of the discharge device 10—1, the wiper 36 (FIGS. 1 and 4) engages the contact 119 to operate the relay 117 (FIG. 4). The relay 117 closes contacts 117a to cause the blocking oscillator 116 to produce a pulse at its output 115. Relay 117 also closes contacts 117b to apply shift pulses to the windings 100, 101, and 102. Output pulses are produced at windings 97 and 99 and are applied to the AND circuit 104 by way of the conductors 106 and 110. Since no output pulse appears at winding 98, the OR circuit 103 will produce no pulse at its output 111. Consequently, the pulse at 115 will cause the gate 114 to apply a pulse to the input 113 of the AND circuit 104. The AND circuit 104 produces a pulse at its output 112 to operate the relay 118. The relay 118 operates the transfer device 10—1 to cause the package 6 to be pushed on to the gravity conveyor 121. The conveyor 121 directs the package 6 to a position adjacent a railroad car upon which it is to be loaded for shipment.

The shift pulse produced by the contacts 117b of relay 117 restores the circuits 91, 92 and 93 to their normal condition in which 0's are stored in each circuit.

When the next succeeding zone pulses are applied to the conductor 33 the address code for the package 6 will be shifted to succeeding stages of the shift register 16 until it is erased by being shifted from the last stage 18–n.

While there has been described what is believed at present to be the preferred embodiment of the invention, it is apparent that various changes and modifications may be made therein; and it is contemplated to cover in the appended claims all such modifications and change as fall within the true scope and spirit of the invention.

What is claimed is:

1. A conveyor system of the type in which an object is placed on a transporting mechanism for movement to a predetermined one of a plurality of discharge stations adjacent a path traversed by the transporting mechanism and in which control circuits cause a transfer mechanism to selectively remove the object from the transporting mechanism when it reaches the predetermined discharge station, wherein the control circuits are characterized by the combination of a first storage device, a manually operated mechanism for causing an address code assigned to the predetermined discharge station to be placed in the storage device, a stationary multi-stage storage device operated in synchronism with the movement of the transporting mechanism along its path and including at least one storage stage for each discharge station, circuits effective incident to the movement of the object past a predetermined position along the transporting mechanism path for transferring its address code from the first storage device to the stationary storage device, circuits for advancing the address code to succeeding stages of the stationary storage device coincident with the movement of the object along at least a portion of the transporting mechanism path, and an address code detector effective when the address code is stored in a stage corresponding to the predetermined discharge station for causing the transfer mechanism to remove the object from the transporting mechanism.

2. A conveyor system of the type in which an object is placed on a transporting mechanism for movement to a predetermined one of a plurality of discharge stations adjacent a path traversed by the transporting mechanism and in which control circuits cause a transfer mechanism to selectively remove the object from the transporting mechanism when it reaches the predetermined discharge station, wherein the control circuits are characterized by the combination of a first storage device, a manually operated mechanism for causing an address code assigned to the predetermined discharge station to be written in the storage device, a shift register including at least one stage for each discharge station, circuits including a photosensitive device for transferring the address code from the storage device to the shift register incident to the movement of the object past a predetermined position along the path, circuits including a switch operated in synchronism with the conveyor for advancing the address code to succeeding stages of the shift register coincident with the movement of the object along at least a portion of the path, and a detector effective subsequent to the transfer of the address code into a shift register stage corresponding to the predetermined discharge station for actuating the transfer mechanism to remove the object from the transporting mechanism.

3. A conveyor system of the type in which objects are placed on an endless transporting mechanism for movement to predetermined ones of a plurality of discharge stations adjacent a path traversed by the transporting mechanism and in which control circuits cause transfer mechanisms at the stations to selectively remove the objects from the transporting mechanism when they reach their predetermined discharge stations, wherein address codes are assigned to the respective discharge stations and wherein the control circuits are characterized by the combination of a first storage device having a plurality of sections arranged in order, a manually operated coding mechanism and a switching device for sequentially writing the address codes of succeeding objects in succeeding storage device sections, a second storage device including at least one position for each transfer mechanism and operated in synchronism with the transporting mechanism for advancing each address code to succeeding positions coincident with the movement of its respective object along at least a portion of the path, circuits for sequentially transferring each address code from the first to the second storage device incident to the movement of its respective object past a predetermined position in the path, and an address code detector for actuating each transfer mechanism subsequent to the movement of its assigned address code into a position corresponding to the transfer mechanism.

4. A conveyor system of the type in which objects are placed on an endless transporting mechanism for movement to predetermined ones of a plurality of discharge stations adjacent a path traversed by the transporting mechanism and in which control circuits cause transfer mechanisms at the stations to selectively remove the objects from the transporting mechanism when they reach their predetermined discharge stations, wherein address codes are assigned to the respective discharge stations and wherein the control circuits are characterized by the combination of a first storage device having a plurality of sections arranged in order, a manually operated coding mechanism for writing the address codes of the objects in the storage device sections, a switching device controlled by the coding mechanism for sequentially connecting the coding mechanism to each of the sections, a second storage device including at least one position for each transfer mechanism and operated in synchronism with the transporting mechanism for advancing each address code to succeeding positions coincident with the movement of its respective object along at least a portion of the path; a switching device for sequentially connecting each of the sections of the second storage device in response to the movement of the objects past a predetermined position along the path, circuits for transferring the address codes from the sections to the second storage device incident to the movement of their respective objects past the predetermined path position, and an address code detector for actuating each transfer mechanism subsequent to the movement of its assigned address code into a position corresponding to the transfer mechanism.

5. A conveyor system of the type in which objects are placed on an endless transporting mechanism for movement to predetermined ones of a plurality of discharge stations adjacent a path traversed by the transporting mechanism and in which control circuits cause transfer mechanisms at the stations to selectively remove the objects from the transporting mechanism when they reach their predetermined discharge stations, wherein address codes are assigned to the respective discharge stations and wherein the control circuits are characterized by the combination of a storage device having a plurality of sections arranged in order, a manually operated coding mechanism and a switching device for sequentially writing the address codes of succeeding objects in succeeding storage device sections, a shift register including at least one stage for each transfer mechanism and operated in synchronism with the transporting mechanism for advancing each address code to succeeding stages coincident with the movement of its respective object along at least a portion of the path, circuits including a switching device and an object sensing device for sequentially transferring the address codes from the storage sections to the shift register incident to the movement of their respective objects past a predetermined position along the path, and an address code detector for actuating each transfer mechanism subsequent to the movement of its assigned address code into its corresponding shift register stage.

6. A conveyor system of the type in which objects are placed on an endless transporting mechanism for movement to predetermined ones of a plurality of discharge stations adjacent a path traversed by the transporting mechanism and in which control circuits cause transfer mechanisms at the stations to selectively remove the objects from the transporting mechanism when they reach their predetermined discharge stations, wherein address codes are assigned to the respective discharge stations and wherein the control circuits are characterized by the combination of a storage device having a plurality of sections arranged in order, a manually operated coding mechanism and a first switching device for sequentially writing the address codes of succeeding objects in succeeding storage device sections, a shift register including at least one stage for each transfer mechanism, a second switching device operated in synchronism with the transporting mechanism to produce a signal for each movement of the transporting mechanism a predetermined distance, an object sensing device for detecting the movement of each object past a predetermined path position, a third switching device controlled by the second switching device and the object sensing device for sequentially transferring each address code from the storage device to the shift register incident to the movement of its respective object past the predetermined position, the shift register controlled by the second switching device for advancing each address code to succeeding stages coincident with the movement of its respective objects along at least a portion of the path, and an address code detector for actuating each transfer mechanism subsequent to the movement of its assigned address code into its corresponding shift register stage.

7. The combination claimed in claim 6 wherein the second switching device produces a plurality of timed signals for each movement of the transporting mechanism a predetermined distance and wherein the address code detector is controlled by a predetermined one of the timed signals to actuate the transfer mechanism when an object is properly aligned therewith.

8. In a conveyor control system of the type in which packages are loaded on a transporting mechanism for movement from a loading position to desired destinations along a path defined by the mechanism, in which a manually operated coding mechanism produces address codes assigned to the desired package destinations, in which a synchronous stationary memory device moves each address code to succeeding positions therein coincident with the movement of the respective package along the path and in which a detector senses each address code to operate a package transfer mechanism when the respective package reaches its desired destination, the combination with the system of a device for sensing each package as it moves past a predetermined path position between the loading position and the destinations, and a storage and switching device controlled by the coding mechanism, the transporting mechanism and the sensing device for writing each address code in the memory device in the order in which packages appear on the transporting mechanism at desired time intervals.

9. In a conveyor control system of the type in which packages are loaded on a transporting mechanism for movement from a loading position to desired destinations along a path defined by the mechanism, in which a manually operated coding mechanism produces address codes assigned to the desired package destinations, in which a synchronous stationary memory device moves each address code to succeeding positions therein coincident with the movement of the respective package along the path and in which a detector senses each address code to operate a package transfer mechanism when the respective package reaches its desired destination, the combination with the system of a device for sensing each package as it moves past a predetermined path position between the loading position and the destinations, a stationary storage device, and switching devices controlled by the coding mechanism for writing each address code into the storage device and controlled at least by the sensing device for transferring each address code from the storage device to the memory device in the order in which respective packages appear on the transporting mechanism.

10. In a conveyor control system of the type in which packages are loaded on a transportation system for movement from a loading position to desired destinations along a path defined by the transporting system, in which a manually operated coding mechanism produces address codes assigned to the desired package destinations, in which a synchronous memory device moves each address code to succeeding positions therein coincident with the movement of the respective package along a portion of the path and in which a detector senses each address code to operate a package transfer mechanism when the respective package reaches its destination, the combination with the coding mechanism of a multi-stage storage device controlled by the coding mechanism for simultaneously storing address codes of a plurality of packages in the order in which packages are loaded on the transportation system and means thereafter effective for transferring the address codes corresponding to each package from the multi-stage storage device to the synchronous memory device when the package is caused to appear at a predetermined position in the path.

References Cited in the file of this patent

UNITED STATES PATENTS

| | | |
|---|---|---|
| 2,717,086 | Bush | Sept. 6, 1955 |
| 2,825,476 | Muller | Mar. 4, 1958 |

FOREIGN PATENTS

| | | |
|---|---|---|
| 203,271 | Australia | Feb. 24, 1955 |
| 741,124 | Great Britain | Nov. 30, 1955 |
| 761,566 | Great Britain | Nov. 14, 1956 |